United States Patent [19]
DeMejo et al.

[11] 4,157,997
[45] Jun. 12, 1979

[54] POLYALKYLENE TEREPHTHALATE AND ORGANOPOLYSILOXANE-POLYCARBONATE BLOCK COPOLYMER BLENDS

[75] Inventors: Lawrence P. DeMejo, Scotia; Richard C. Bopp, Ballston Lake, both of N.Y.

[73] Assignee: General Electric Company, Schenectady, N.Y.

[21] Appl. No.: 890,592

[22] Filed: Mar. 20, 1978

[51] Int. Cl.$^2$ ................................................ C08K 3/26
[52] U.S. Cl. .............................. 260/40 R; 260/37 PC; 260/375 B; 260/824 R; 260/860
[58] Field of Search .................. 260/40 R, 860, 824 R

[56] References Cited

U.S. PATENT DOCUMENTS

| 3,379,790 | 4/1968 | Krauss et al. | 260/824 R |
|---|---|---|---|
| 3,419,634 | 12/1968 | Vaughn | 260/824 R |
| 3,419,635 | 12/1968 | Vaughn | 260/824 R |
| 3,691,257 | 9/1972 | Kendrick et al. | 260/824 R X |
| 3,701,815 | 10/1972 | Matzner et al. | 260/824 R |
| 3,742,083 | 6/1973 | Bialous | 260/860 X |
| 3,821,325 | 6/1974 | Merritt et al. | 260/824 R |
| 3,832,419 | 8/1974 | Merritt | 260/824 R |
| 3,884,858 | 5/1975 | Morawetz | 260/824 R X |
| 3,892,821 | 7/1975 | Koleske et al. | 260/860 |
| 3,935,154 | 1/1976 | Cawley | 260/824 R X |
| 3,975,355 | 8/1976 | Bollen et al. | 260/860 X |
| 4,013,613 | 3/1977 | Abolins et al. | 260/40 R |
| 4,044,073 | 8/1977 | Baron et al. | 260/860 |

Primary Examiner—Sandra M. Person
Attorney, Agent, or Firm—F. Wesley Turner; Joseph T. Cohen; Charles T. Watts

[57] ABSTRACT

A blend comprising a polyalkylene terephthalate resin, an organopolysiloxane-polycarbonate block copolymer and a calcium carbonate filler having improved warp and impact properties. The polymer blends can be molded or formed into films, sheets, fibers, laminates, or other improved molded articles of manufacture including reinforced articles by conventional techniques.

10 Claims, No Drawings

POLYALKYLENE TEREPHTHALATE AND ORGANOPOLYSILOXANE-POLYCARBONATE BLOCK COPOLYMER BLENDS

CROSS REFERENCE TO RELATED APPLICATIONS

This invention is related to subject matter disclosed in copending U.S. applications Ser. Nos. 868,023, 867,985, 868,021, and 869,109, filed on 1/9/78, 1/9/78, 1/9/78, and 1/13/78, respectively. All of the aforesaid applications are assigned to the same assignee of this application. All of the disclosures referenced therein are incorporated herein in their entirety by reference.

BACKGROUND OF THE INVENTION

1. Field of the Invention

This invention relates to polymer blends comprising a polyalkylene terephthalate resin, an organopolysiloxane-polycarbonate block copolymer, and a calcium carbonate filler. The polymer blends have improved mechanical properties including improved warp and impact values.

2. Description of the Prior Art

Polyalkylene terephthalate resins are well-known to those skilled in the art—including their associated physical and chemical characteristics—as reported in numerous publications e.g. U.S. Pat. No. 2,465,319 (Whinfield et al.) issued Mar. 22, 1949; U.S. Pat. No. 3,047,539 (Pengilly) issued July 31, 1962; U.S. Pat. No. 3,859,246 (Jackson, Jr. et al.) issued Jan. 7, 1975; U.S. Pat. No. 4,043,971 (Wurmb et al.) issued Aug. 23, 1977; and the Encyclopedia of Polymer Science and Technology Vol. II, entitled *Polyesters,* pages 62–128, Interscience Publishers (1969), which publications are incorporated herein in their entirety by reference.

Organopolysiloxane-polycarbonate block copolymers are also well-known to those skilled in the art and are described in various U.S. and foreign patent applications including U.S. Pat. No. 3,821,325 (Merritt, Jr. et al.) issued June 28, 1974; U.S. Pat. No. 3,419,635 and U.S. Pat. No. 3,419,634 (both of Vaughn, Jr.) both issued Dec. 31, 1968; U.S. Pat. No. 3,832,419 (Merritt, Jr.) issued Aug. 27, 1974 and U.S. Pat. No. 3,189,662 (Vaughn, Jr.) issued June 15, 1965, among others.

Heretofore, to the best of the knowledge of applicants, blends of polyalkylene terephthalate resins and organopolysiloxane polycarbonate block copolymers containing calcium carbonate fillers having improved mechanical properties have not been reported by the prior art.

DESCRIPTION OF THE INVENTION

This invention embodies polymer blends comprising a polyalkylene terephthalate resin, an organopolysiloxane-polycarbonate block copolymer and a calcium carbonate filler having improved warp and impact properties.

The "polyalkylene terephthalate resin" can be any resin comprising a high molecular weight poly(1,4-alkylene terephthalate) having repeating units of the general formula:

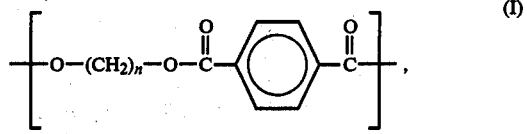

$n$ being a number of from 1 to 50. The poly(1,4-alkylene terephthalate resins can contain mixtures thereof, including copolyesters, i.e. esters that contain a minor amount, e.g. from about 0.5 to about 2% by weight, of repeating units derived from an aliphatic or another aromatic dicarboxylic acid and/or another aliphatic diol or polyol. Among the units which can be present in the copolyesters are those derived from aliphatic dicarboxylic acids, e.g. acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g. acids having up to about 36 carbon atoms, such as isophthalic acid and the like. In a preferred embodiment, in addition to polybutylene terephthalate (PBT) units derived from 1,4-butylene glycol, there can also be minor amounts of units derived from other aliphatic glycols and polyols, e.g. di- and polyols having up to about 50 carbon atoms, including ethylene glycol, propylene glycol, cyclohexanediol, and the like. Such copolyesters can be made by techniques well known to those skilled in the art including techniques taught by Winfield et al., U.S. Pat. No. 2,465,319; Pengilly, U.S. Pat. No. 3,047,539, among others.

Illustratively, presently preferred PBT resin blend components have an intrinsic viscosity, when employed in blends containing nonreinforcing and reinforcing fillers, of at least 0.2 and preferably at least 0.8 deciliters per gram (dl./g.), as measured in o-chlorophenol, a 60/40 phenol-tetrachloroethane mixture or a similar solvent at 25°–30° C. The upper intrinsic viscosity limit is not critical, however will generally be about 2.5 dl./g. Presently preferred PBT resin blend components will have intrinsic viscosity within the ranges of from about 1.0 to about 1.5 when employed in either nonreinforced or reinforced blends.

The "organopolysiloxane-polycarbonate block copolymer" can be any copolymer comprising organopolysiloxane-polycarbonate blocks having repeating units of the general formulae:

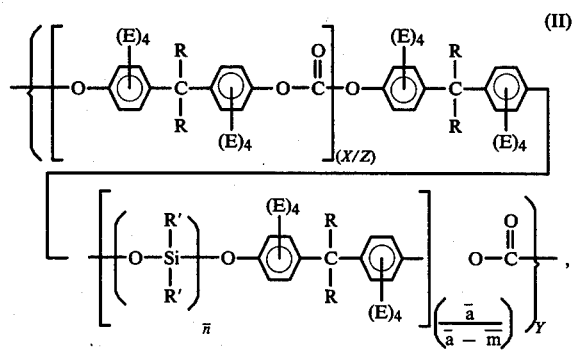

where X is an integer equal to 1 to 1000, inclusive, preferably 2 to 100, $\bar{n}$ is a number average equal to 1 to 100, inclusive, preferably 5 to 40, ā is a number average equal to 1.1 to 100, m̄ is equal to 1, and Z is an integer equal to 1 to 1000, inclusive, preferably 5 to 12, E, R, and R' being as defined hereinafter.

Illustratively, well known organopolysiloxane-polycarbonates are described by the following general formulae:

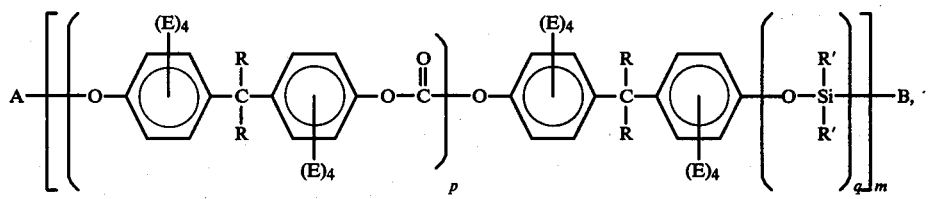

where m is at least 1, and preferably m is an integer equal to from 1 to about 1,000, inclusive, p is equal to from 1 to about 200, inclusive, q is equal to from about 5 to about 200, inclusive, and preferably q has an average value from about 10 to about 90, inclusive, while the ratio of p to q can vary from about 0.005 to about 40, inclusive, B is

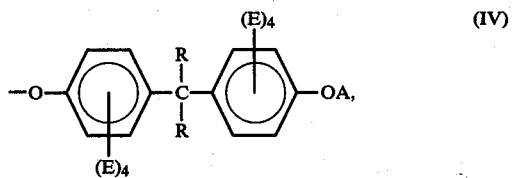

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and E is a member selected from the class of hydrogen, lower alkyl radicals and halogen radicals and mixtures thereof.

Included within the radicals represented by R of Formulas II and III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl propyl, chlorobutyl, cyclohexyl, etc.; R can be all the same radical or any two or more of the aforementioned radicals, while R is preferably methyl, R' includes all radicals included by R above except hydrogen, where R' also can be all the same radical or any two or more of the aforementioned R radicals except hydrogen and R' is preferably methyl. R' also includes, in addition to all the radicals included by R, except hydrogen, cyanoalkyl radicals such as cyanoethyl, cyanobutyl, etc. radicals. Radicals that are included within the definition of E of Formulas II and III are hydrogen, methyl, ethyl, propyl, chloro, bromo, iodo, etc. and combinations thereof, and E is preferably hydrogen.

The organopolysiloxane-polycarbonate block copolymers can be made by any technique known to those skilled in the art including the techniques described by Merritt, Jr., Merritt, Jr. et al., and Vaughn Jr. in the U.S. patents referenced in the description of the prior art hereinbefore. Accordingly, all of the procedures described in the aforesaid patents relating to methods for the preparation of the organopolysiloxane-polycarbonate block copolymers are incorporated herein in their entirety by reference.

Illustratively presently preferred organopolysiloxane-polycarbonate block copolymers contain repeating units of Formula II, set out herein before wherein X, Y, Z, ā, n̄ and m̄ are as defined hereafter:

Copolymer Type "A"

X equals ~7
Y equals ~8 to 10
Z equals ~1
ā equals ~2
n̄ equals ~10
m̄ equals ~1

Copolymer Type "B"

X equals ~10
Y equals ~8 to 10
Z equals ~1
ā equals ~2
n̄ equals ~20
m̄ equals ~1

Copolymer Type "C"

X equals ~5
Y equals ~8 to 10
Z equals ~1
ā equals ~2
n̄ equals ~20
m̄ equals ~1

Blends of polyalkylene terephthalate (PAT) resins and organopolysiloxane-polycarbonate (PS-PC) block copolymers comprise blends of any proportion of the aforesaid resins and copolymers. In general, a presently preferred blend contains at least 5 parts of PS-PC block copolymer per 100 parts of PAT resin. Even more preferably are compositions wherein the PS-PC block copolymer component is present in an amount of at least about 5-30 parts, and more preferably from about 10-25 parts per 100 parts of PAT resin.

The calcium carbonate filler can be any calcium carbonate comprising calcium carbonate having a particle size limit of 40 microns, preferably 25 microns and even more preferably having in addition to a top limitation of 25 microns, an average particle size of 10, preferably 5 microns or less. Those skilled in the art recognize calcium carbonate generally can comprise in addition to calcium carbonate as a major constituent derived from limestone other chemical constituents such as silicon dioxide ($SiO_2$), aluminum oxide ($Al_2O_3$) and ferric oxide ($Fe_2O_3$) in amounts of less than 3 percent combined and less than about 1½ percent by weight of the calcium carbonate content of the limestone product. The calcium carbonates can be surface treated with fatty acids, fatty acid soaps, silanes, titanates, or other suitable materials to provide improved dispersibility.

Since the relative proportions of polyalkylene terephthalate resins, organopolysiloxane-polycarbonate block copolymer and calcium carbonate filler significantly affect the warp and impact properties of the polymer blends, calcium carbonate is limited to amounts of less than 35 parts per 100 parts of blend of polyalkylene terephthalate and polysiloxane polycarbonate block copolymer, and preferably is within the range of from about 5–30 and more preferably from 10–25 parts per 100 parts of PAT and PS-PC polymer blend.

Although it is not necessary that a reinforcing agent be present in the compositions of this invention, in another presently preferred embodiment, where glass filaments, e.g. fiber glass, are employed having an aspect ratio (l/d), preferably within the range of 1:1 to 100:1 the reinforcing agent is present in amounts of less than about 20 parts, and more preferably less than 10 parts per 100 parts of PAT/PS-PC blend components. As used herein, the term fiberglass refers to the common fiberglass reinforcements used as reinforcing fillers for thermoplastic materials. In addition or as an alternate to fiberglass, other reinforcing agents can be employed, e.g. fibers, whiskers or platelets of metals, e.g. aluminum, iron or nickel and the like; nonmetals, e.g. ceramics, carbon filaments, silicates, asbestos, titanium dioxide and titanate whiskers, and quartz, etc. The term "reinforcing filler" is used herein to define materials which add to the strengths, stiffness and impact strength of the polymer blends. Where the material does not add to all three of the aforementioned properties, the material is defined herein as an extending filler and not a reinforcing filler by definition.

Any of the methods well known to the art can be employed in the preparation of the compositions of this invention. Illustrative techniques include mixing of polyalkylene terephthalate resin organopolysiloxane-polycarbonate block copolymer and calcium carbonate fillers in powder or granular form, extruding and shaping into pellets or other suitable forms. Any reinforcing agent or any other additive can be added to a PAT and PS-PC composition in any conventional manner, e.g. dry mixing, hot melt mixing, etc., employing an extruder, a heated mill or any other mixing device, such as a Banbury mixer.

The compositions can be molded with any equipment conventionally used for unreinforced or reinforced thermoplastic compositions. For example, good results can be obtained using conventional molding machines, which employ plungers or reciprocating-screws, etc., conventional molding temperatures, e.g. about 450°–500° F., and conventional mold temperatures, e.g. 150° F.

In order that those skilled in the art may better understand our invention, the following examples are given which are illustrative of the best mode of this invention, however, these examples are not intended to limit the invention in any manner whatsoever. In all the examples, the compositions were prepared in accordance with the following general procedure. Also, in all of the examples, all parts are by weight unless otherwise stated.

GENERAL PROCEDURE

A series of blends were prepared from commercially available materials comprising (A) poly(1,4-butylene terephthalate) having an intrinsic viscosity of 1.2 dl./g., measured at 25° C. in hexafluoroisopropanol, (B) an organopolysiloxane-polycarbonate block copolymer having an intrinsic viscosity within the range of 0.5 to 1.5 dl./g., measured at 25° C. in chloroform or methylene chloride, and (C) calcium carbonate by dry blending and precompounding in a hot melt extruder. The extrudate was pelletized. For comparative purposes, compositions containing poly(1,4-butylene terephthalate) alone or in combination were also prepared in pellet form. The resin and copolymer blends, and control compositions were separately molded into appropriate test shapes, e.g. bars, rods, etc.

EXAMPLE I

Several combinations of polybutylene terephthalate, polysilicone-polycarbonate block copolymer and calcium carbonate were blended at 460°–480° F. in a Werner & Pfleiderer twin screw extruder. The blends were extruded at a rate of 8 pounds per hour. The extruded blends were injection molded under nominally identical conditions, and injected into appropriate mold samples at 150° F. A summary of the mechanical properties of the blends with the proportions of the polybutylene terephthalate resin, polysilicone-polycarbonate block copolymer and calcium carbonate fillers are set out in Tables IA, IB and IC hereafter. The test procedures employed to record the physical properties of the blends of this invention and the controls were as follows: Izod Impact Strength (ASTMD 256, Method A), Gardner Impact Strength (Modified ASTMD 3029-72; 0.625" diameter dart into a ⅛" thick plaque resting on a 0.640" diameter of hole), Tensile Properties-Yield Strength (ASTMD 1822), Flexural Properties (ASTMD 790), Heat Deflection Temperature (ASTMD 648-56). The Warp Index was measured in millimeters and is defined herein as the maximum height attainable above horizontal at the edge of a 4" diameter 1/16" disk that a disk reaches when the opposite edge of the disk is pressed flat.

TABLE IA

| PROPERTIES OF PBT RESIN, PS-PC BLOCK COPOLYMERS AND CALCIUM CARBONATE | | | | | |
|---|---|---|---|---|---|
| Run No. | 1 | 2 | 3 | 4 | 5 |
| COMPOSITION (parts by weight) | | | | | |
| Polybutylene Terephthalate[1] | 100 | 100 | 100 | 100 | 100 |
| LR-3320[2] | | | 6 | 12.5 | 20 |
| $CaCO_3$[3] | | 11 | 12 | 12.5 | 13.3 |
| PHYSICAL PROPERTIES | | | | | |
| Impact Strength | | | | | |

TABLE IA-continued
PROPERTIES OF PBT RESIN, PS-PC BLOCK COPOLYMERS AND CALCIUM CARBONATE

| Run No. | 1 | 2 | 3 | 4 | 5 |
|---|---|---|---|---|---|
| Izod (ft-lbs/in. notch) | 0.7 | 0.7 | 0.9 | 1.2 | 1.5 |
| Gardner (in.lbs) | 240 | 210 | 220 | 270 | 90 |
| Tensile Properties | | | | | |
| Yield Strength ($10^3$ psi) | 7.0 | 7.1 | 6.7 | 5.9 | 5.2 |
| Ultimate Elongation (%) | 298 | 90 | 80 | 150 | 199 |
| Flexural Properties | | | | | |
| Modulus ($10^5$ psi) | 3.6 | 3.8 | 3.4 | 3.1 | 3.0 |
| Yield Strength ($10^4$ psi) | 1.3 | 1.3 | 1.2 | 1.0 | 1.0 |
| Heat Deflection Temperature at 264 psi (°C.) | | | | | |
| As molded | 55 | 57 | 57 | 53 | 50 |
| Annealed[a] | 60 | 60 | 57 | 54 | 54 |
| Warp Index (mm) | | | | | |
| As molded | 0 | 0 | 0 | 0 | 0 |
| Annealed[4] | 8.5 | 4 | 10.5 | 6 | 4 |

[1] Polybutylene terephthalate-Valox ® 310 — commercial product GE ® Company
[2] Polysiloxane-polycarbonate — analogous to copolymer Type A, page 6
[3] Superflex — Pfizer ® average particle size 0.7 microns
[4] Annealed for 30 minutes in air at 177° C. prior to testing

TABLE IB
PROPERTIES OF PBT RESIN, PS-PC BLOCK COPOLYMERS AND CALCIUM CARBONATE

| Run No. | 1 | 2 | 3 | 4 | 5 |
|---|---|---|---|---|---|
| COMPOSITION (parts by weight) | | | | | |
| Polybutylene Terephthalate[1] | 100 | 100 | 100 | 100 | 100 |
| LR-3320[2] | | | 7 | 14.3 | 23 |
| CaCO$_3$[3] | | 25 | 27 | 29 | 31 |
| PHYSICAL PROPERTIES | | | | | |
| Impact Strength | | | | | |
| Izod (ft-lbs/in. notch) | 0.7 | 0.5 | 0.7 | 1.0 | 1.3 |
| Gardner (in.lbs) | 240 | 160 | 210 | 40 | 160 |
| Tensile Properties | | | | | |
| Yield Strength ($10^3$ psi) | 7.0 | 6.5 | 6.4 | 5.6 | 4.9 |
| Ultimate Elongation (%) | 298 | 21 | 20 | 23 | 44 |
| Flexural Properties | | | | | |
| Modulus ($10^5$ psi) | 3.6 | 4.1 | 3.9 | 3.6 | 3.1 |
| Yield Strength ($10^4$ psi) | 1.3 | 1.3 | 1.1 | 1.1 | 1.0 |
| Heat Deflection Temperature at 264 psi (°C.) | | | | | |
| As Molded | 55 | 57 | 54 | 53 | 52 |
| Annealed[a] | 60 | 75 | 60 | 57 | 56 |
| Warp Index (mm) | | | | | |
| As Molded | 0 | 0 | 0 | 0 | 0 |
| Annealed[4] | 8.5 | 1 | 0 | 6 | 4.5 |

[1] Polybutylene terephthalate-Valox ® 310 — commercial product GE ® Company
[2] Polysiloxane-polycarbonate — analogous to copolymer Type A, page 6
[3] Superflex — Pfizer ® average particle size 0.7 microns
[4] Annealed for 30 minutes in air at 177° C. prior to testing

TABLE IC
PROPERTIES OF PBT RESIN, PS-PC BLOCK COPOLYMERS AND CALCIUM CARBONATE

| Run No. | 1 | 2 | 3 | 4 | 5 |
|---|---|---|---|---|---|
| COMPOSITION (parts by weight) | | | | | |
| Polybutylene Terephthalate[1] | 100 | 100 | 100 | 100 | 100 |
| LR-3320[2] | | | 7.7 | 16.7 | 27 |
| CaCO$_3$[3] | | 43 | 46 | 50 | 54 |
| PHYSICAL PROPERTIES | | | | | |
| Impact Strength | | | | | |
| Izod (ft-lbs/in. notch) | 0.7 | 0.5 | 0.5 | 0.6 | 0.6 |
| Gardner (in.lbs.) | 240 | 10 | 40 | 8 | 8 |
| Tensile Properties | | | | | |
| Yield Strength ($10^3$ psi) | 7.0 | 7.4[a] | 5.9[a] | 5.4[a] | 4.3[a] |
| Ultimate Elongation (%) | 298 | 9 | 11 | 11 | 11 |
| Flexural Properties | | | | | |
| Modulus ($10^5$ psi) | 3.6 | 4.8 | 4.4 | 4.1 | 3.4 |
| Yield Strength ($10^4$ psi) | 1.3 | 1.3 | 1.1 | 1.0 | 0.8 |
| Heat Deflection Temperature at 264 psi (°C.) | | | | | |
| As Molded | 55 | 78 | 61 | 56 | 55 |
| Annealed[a] | 60 | 114 | 64 | 62 | 59 |
| Warp Index (mm) | | | | | |

TABLE IC-continued
PROPERTIES OF PBT RESIN, PS-PC BLOCK COPOLYMERS AND CALCIUM CARBONATE

| Run No. | 1 | 2 | 3 | 4 | 5 |
|---|---|---|---|---|---|
| As Molded | 0 | 0 | 0 | 0 | 0 |
| Annealed[4] | 8.5 | 0.5 | 1 | 5.5 | 3.5 |

[a]Specimens did not yield before failure
[1]Polybutylene terephthalate-Valox ® 310 — commercial product GE ® Company
[2]Polysiloxane-polycarbonate — analogous to copolymer Type A, page 6
[3]Superflex — Pfizer ® average particle size 0.7 microns
[4]Annealed for 30 minutes in air at 177° C. prior to testing The polymer blends comprising polyalkylene terephthalate resin, organopolysiloxane-polycarbonate block copolymers and calcium carbonate filler, in both reinforced and unreinforced form as defined herein, can be injection, compression and transfer molded into various shaped articles of manufacture, e.g. automotive and appliance utilized articles, extruded to produce films, and other forms having complicated cross-sections as well as cross head extruded hoses, wires, cables and other substrate covers.

We claim:

1. An improved high impact low warp polymer blend comprising a polyalkylene terephthalate resin, an organopolysiloxane-polycarbonate block copolymer, and a calcium carbonate filler.

2. The claim 1 blend, where on a weight basis at least 5 parts of the copolymer is present per 100 parts of resin, and less than 35 parts of the carbonate is present per 100 parts of resin and copolymer.

3. The claim 2 blend, where 5-30 parts of the copolymer and 5-30 parts of the carbonate are present.

4. The claim 3 blend where 10-25 parts of the copolymer and 10-25 parts of the carbonate are present.

5. The claim 1 blend, where said copolymer is of the formula

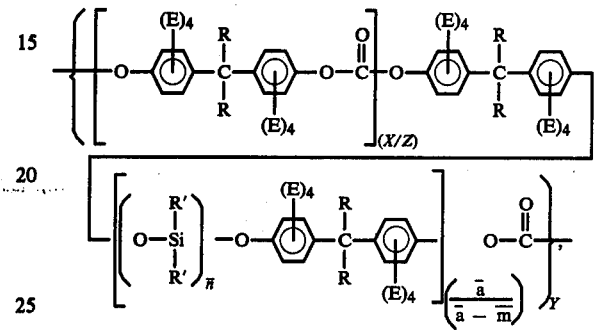

where X is an integer equal to 1 to 1000, inclusive, preferably 2 to 100, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12, E is a member selected from the class of hydrogen, lower alkyl radicals and halogen radicals and mixtures thereof, R is a member selected from the class of hydrogen, monovalent hydrocarbon radicals and halogenated monovalent hydrocarbon radicals, and R' is a member selected from the class of monovalent hydrocarbon radicals, halogenated monovalent hydrocarbon radicals and cyanoalkyl radicals.

6. The claim 5 blend, where X equals about 7; Y equals about 8 to 10; Z equals about 1; $\bar{a}$ equals about 2; $\bar{n}$ equals about 10; and $\bar{m}$ equals about 1.

7. The claim 5 blend where X equals about 10; Y equals about 8 to 10; Z equals about 1; $\bar{a}$ equals about 2; $\bar{n}$ equals about 20; and $\bar{m}$ equals about 1.

8. The claim 5 blend where X equals about 5; Y equals about 8 to 10; Z equals about 1; $\bar{a}$ equals about 2; $\bar{n}$ equals about 20; and $\bar{m}$ equals about 1.

9. The claim 1 blend where the particle size of the carbonate is less than 40 microns.

10. The claim 2 blend where less than 20 parts of fiber glass reinforcing filler per 100 parts of resin and copolymer is present.

* * * * *